US008316456B2

(12) United States Patent
Siukonen

(10) Patent No.: US 8,316,456 B2
(45) Date of Patent: Nov. 20, 2012

(54) SYSTEM AND METHOD FOR REPRESENTING A SECURE TIME IN A DEVICE BASED UPON AN INSECURE CLOCK

(75) Inventor: Juha Siukonen, Tampere (FI)

(73) Assignee: Nokia Corporation (FI)

( * ) Notice: Subject to any disclaimer, the term of this patent is extended or adjusted under 35 U.S.C. 154(b) by 1171 days.

(21) Appl. No.: 11/026,944

(22) Filed: Dec. 30, 2004

(65) Prior Publication Data

US 2006/0150254 A1 Jul. 6, 2006

(51) Int. Cl.
*G06F 7/04* (2006.01)
(52) U.S. Cl. ............. 726/27; 726/7; 713/400; 713/502; 713/600; 380/201; 705/57
(58) Field of Classification Search .................. 713/1, 2, 713/188, 194, 178, 400, 502, 600; 380/200, 380/201, 255, 277, 25; 726/2, 22, 27, 7; 705/57

See application file for complete search history.

(56) References Cited

U.S. PATENT DOCUMENTS

| | | | |
|---|---|---|---|
| 5,444,780 A | 8/1995 | Hartman, Jr. | |
| 5,500,897 A * | 3/1996 | Hartman, Jr. | 713/178 |
| 6,240,264 B1 * | 5/2001 | Yajima et al. | 399/82 |
| 6,732,093 B2 * | 5/2004 | Vally et al. | 707/4 |
| 6,980,731 B1 * | 12/2005 | Tahara et al. | 386/52 |
| 7,116,969 B2 * | 10/2006 | Park | 455/410 |
| 7,536,524 B2 * | 5/2009 | Shaath et al. | 711/163 |
| 2002/0016775 A1 * | 2/2002 | Nakagawa | 705/52 |
| 2002/0054068 A1 * | 5/2002 | Ellis et al. | 345/716 |
| 2002/0082997 A1 * | 6/2002 | Kobata et al. | 705/51 |
| 2003/0037229 A1 | 2/2003 | Baron | |
| 2003/0105890 A1 | 6/2003 | Sakuma | |
| 2003/0174587 A1 | 9/2003 | Bening | |
| 2004/0236788 A1 * | 11/2004 | Sato et al. | 707/104.1 |
| 2006/0069649 A1 * | 3/2006 | Morten et al. | 705/57 |
| 2009/0271586 A1 * | 10/2009 | Shaath | 711/163 |

FOREIGN PATENT DOCUMENTS

| | | |
|---|---|---|
| CN | 1422095 A | 6/2003 |
| EP | 1414210 A | 4/2004 |
| EP | 1414210 A1 | 4/2004 |
| JP | 2005009972 | 1/2005 |

OTHER PUBLICATIONS

European Search Reported for Application No. 05825293.3 dated Mar. 18, 2009, 5 pages.
Notification of 2nd Office Action, The Patent Office of the People's Republic of China, mailed May 8, 2009, 12 pages.
Notification of 3rd Office Action for Chinese Application No. 200580048022.4, mailed Jan. 8, 2010, 14 pages.
Rejection Decision for Chinese Application No. 200580048022.4, dated Jul. 5, 2010, 15 pages
European Application No. 05 825 293.3—Office Action dated Jan. 24, 2012.

* cited by examiner

*Primary Examiner* — April Shan
*Assistant Examiner* — Joseph Pan
(74) *Attorney, Agent, or Firm* — Banner & Witcoff, Ltd.

(57) ABSTRACT

A system and method for providing modified rights information to an application on an electronic device. A centralized component monitors both a system clock and a secure clock. The centralized component calculates the difference between the time of the system clock and the time of the secure clock and thereafter modifies the access rights information for the application by the difference between the times. The modified access rights information is then presented to the application for use.

13 Claims, 4 Drawing Sheets

SYSTEM AND METHOD FOR REPRESENTING A SECURE TIME IN A DEVICE BASED UPON AN INSECURE CLOCK

BACKGROUND OF THE INVENTION

The present invention relates generally to the use of various applications on electronic devices. More particularly, the present invention relates to the use of applications on electronic devices where access to content is granted based upon access rights information provided by content providers and/or operators.

BACKGROUND OF THE INVENTION

Like many other electronic devices, users of mobile telephones are provided with the ability to freely change the date and time information on the telephone, as well the ability to alter time zone information. For this reason, a secure clock is used in time-based access control instead of a less-secure system clock.

When applications are making decisions whether to allow access to protected content, based for example on the Digital Rights Management (DRM) standard of Open Mobile Alliance (OMA), the applications need to know the secure time in order to do so. OMA DRM is a technology that allows control over consumption of various media objects, such as ring tones, images, etc., by mobile terminals. Control is exercised by supplementing each media object with a rights object that defines rules according to which media object is consumed. With some modification, this technology can also be applied to Java Mobile Information Device Protocol (MIDP) applications. If the device in question is fully compliant with the OMA DRM v1/v2 standard, for example, it is required that a secure time source be used when granting access to content restricted by interval constraints or constraints with start and/or end times.

However, when applications are making decisions whether to grant access to content based upon access rights information provided by content providers and operators, the applications can currently only rely on date and time information provided by the insecure system clock. Even if a secure clock providing a secure time was publicly available to every application, significant integration efforts would still be required for several applications in order to directly make use of such a secure time source. Additionally, showing the user two different clocks with different times would become difficult to absorb and comprehend by the user.

Although attempts have been made to overcome the above-identified shortcomings, each of these attempted solutions possess their own advantages. For example, the concept of a secure time source was introduced to platform applications, but it was not anticipated to have this feature be brought to the user's attention. For this reason, the secure time source was considered to be very confusing since applications would know the secure time and use it instead of system time, while content would stop working according to the secure time. Furthermore, in cases when the system clock is off, even by as few as a couple of minutes, the user experience might become relatively confusing. Additionally, integration of the secure clock to virtually every application would be very difficult to implement, and such an action would complicate the implementation of the overall system.

SUMMARY OF THE INVENTION

The present invention provides for a system and method for using a centralized component for storing and managing all the access rights information which the user receives from content providers. Other applications can ask for access rights information from this component. The centralized component calculates the difference between the time and date of the device's insecure system clock and the time and date of a secure clock. The access rights information is then modified by the calculated difference. The modified access rights information is then provided to the applications and to the user.

The present invention provides current device applications with significant advantages over the prior art. When information is processed by applications or presented to the user in systems implementing the present invention, the date and time information that is presented and used is always relative to the device's system clock, with which both the applications and the user are already familiar. With the present invention, the user also is not faced with potential confusion from using two different clocks. The date and time information that are presented are also according to original access rights given by content providers.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
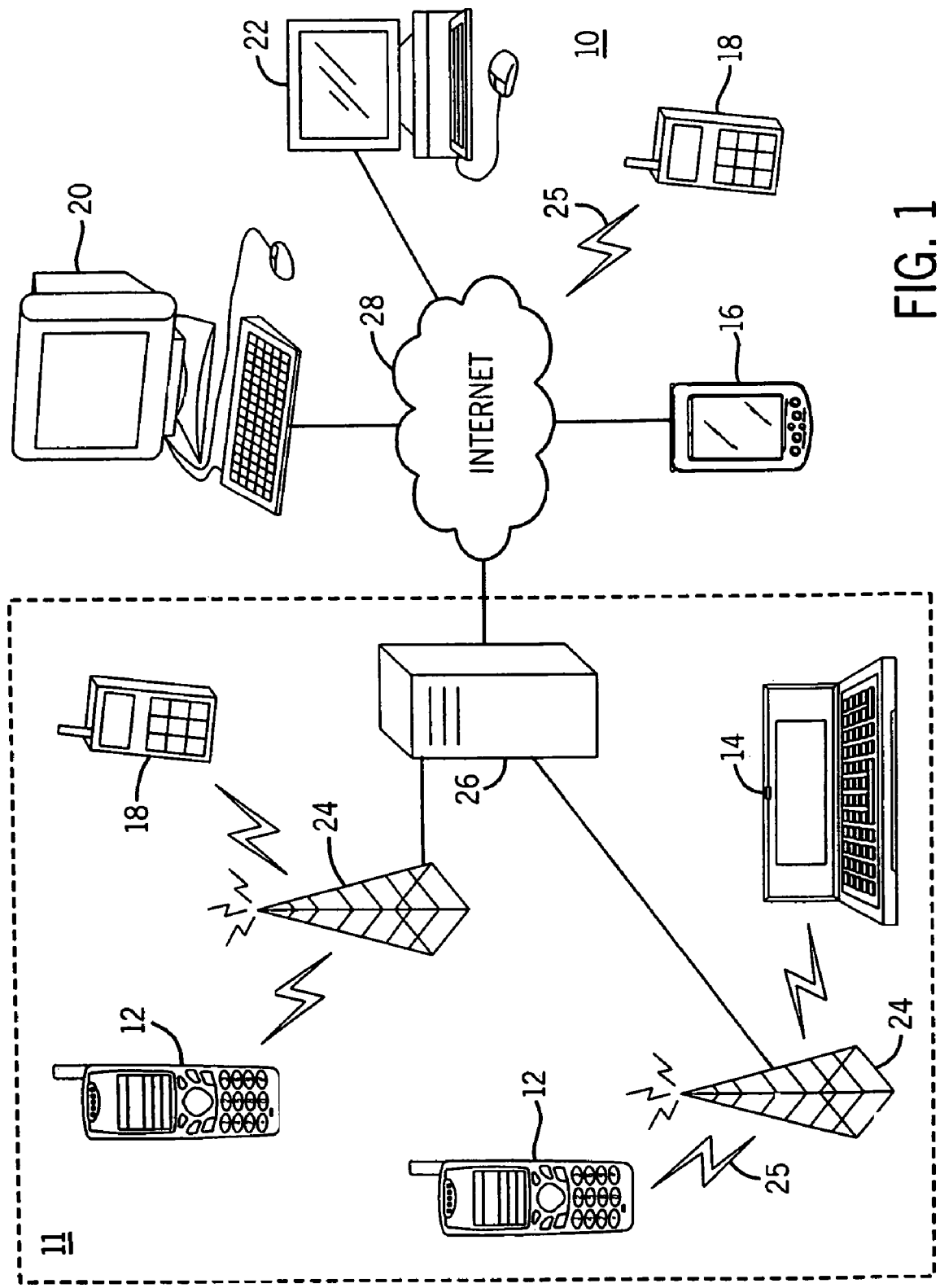
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
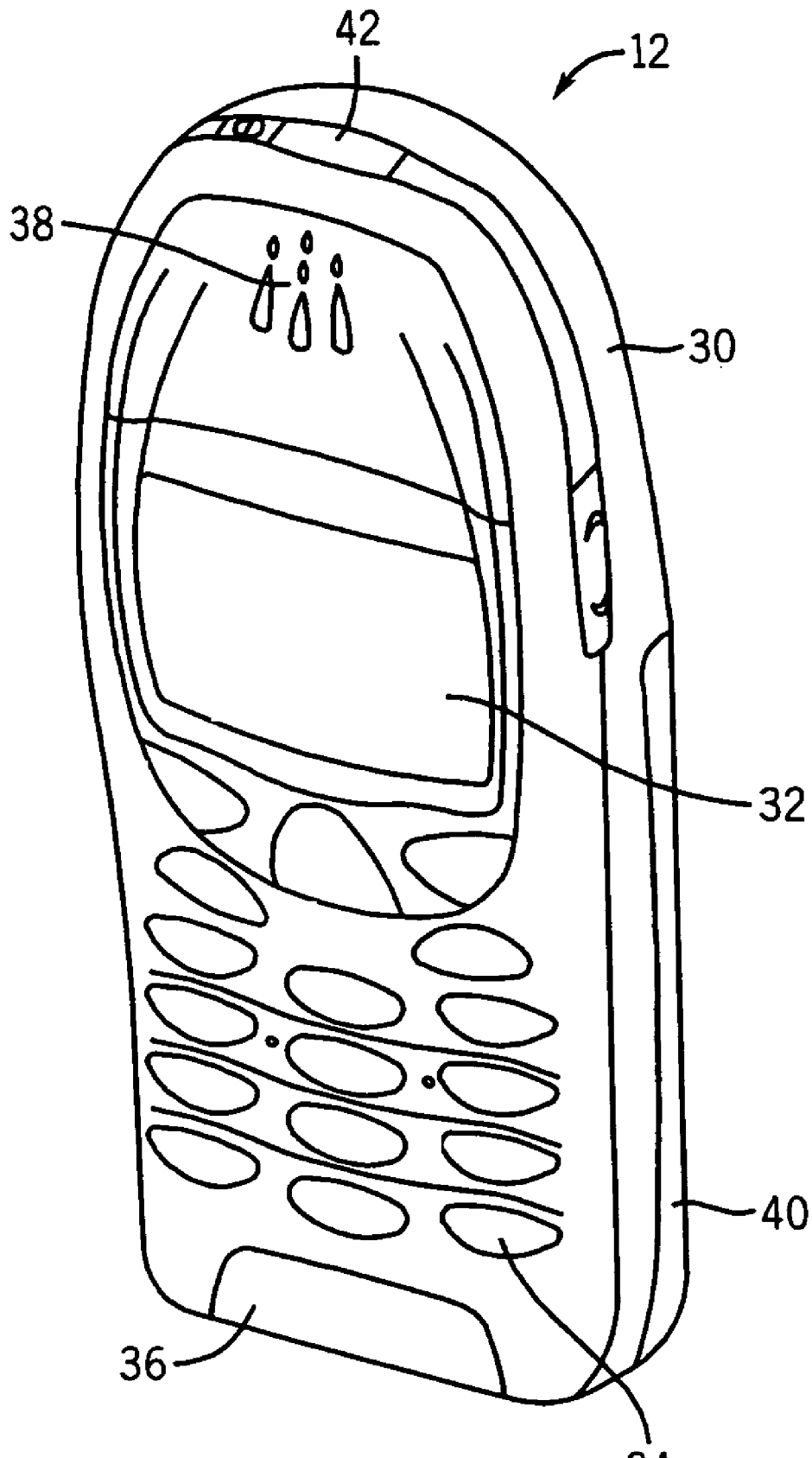
FIG. 2 is a perspective view of a mobile telephone that can be used in the implementation of the present invention.
Figure 3:
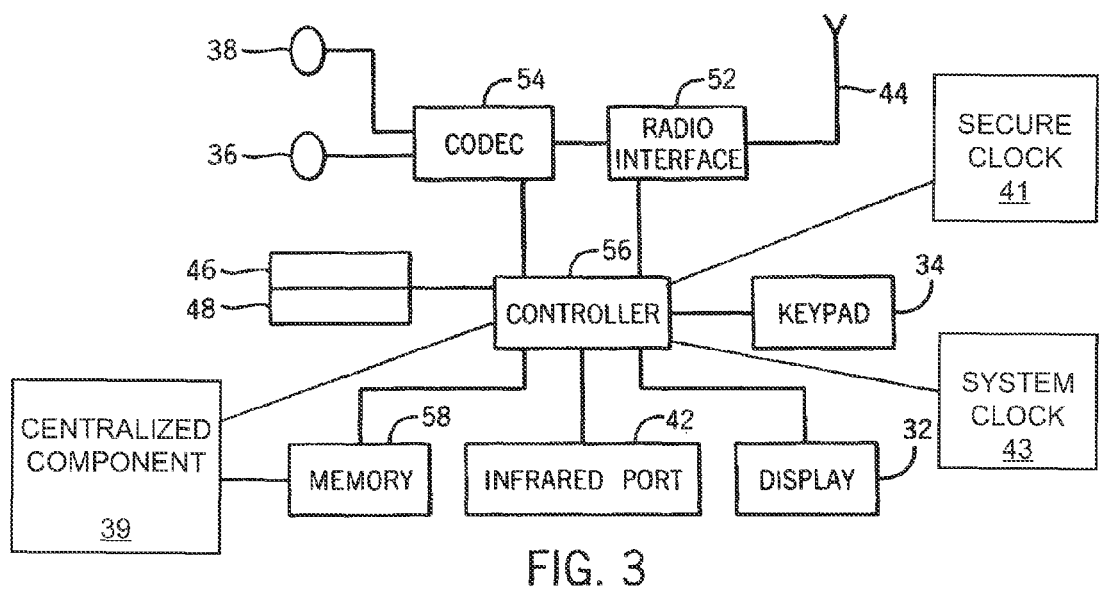
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a system clock 43, a card reader 48, radio interface circuitry 52, codec circuitry 54, a controller 56 and a memory 58. Individual circuits and elements are all of a type well known in the art, for example in the Nokia range of mobile telephones.

The present invention provides for a centralized component in an electronic device for storing and managing all of the access rights information the user receives from content providers. The electronic device is described herein as the mobile telephone 12 of FIGS. 2 and 3. However, it should be noted that the present invention can be incorporated into a wide variety of types of electronic devices. A centralized component is identified as item 39 in FIG. 3 and is operatively connected to the controller 56 and the memory 58. It is also possible for the centralized component to be formed as part of the controller 56, the memory 58 or another component inside the mobile telephone 12.

Other applications can ask for access rights information from the centralized component 39. When the centralized component 39 provides access rights information to other applications, it can access a secure clock 41, which can exist virtually anywhere within the system 10 of FIG. 1 or within the mobile telephone 12 or other electronic device, as well as the system clock 43, which is insecure, of the mobile telephone 12. Importantly, this access can occur by itself and without the need of other components to even know about the implementation of the present invention. Therefore, the secure clock 41 can be completely hidden from other applications and from the user.

Figure 4:
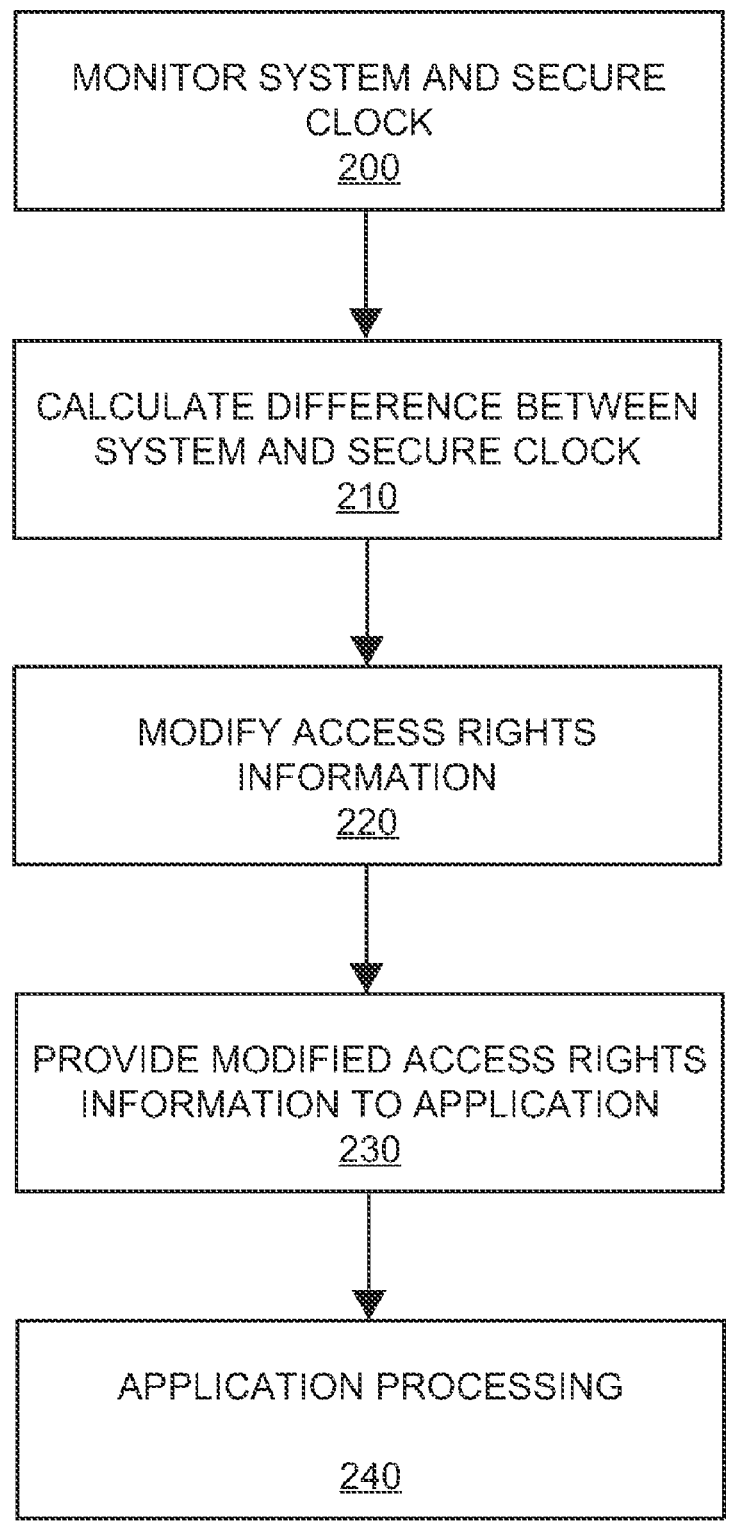
FIG. 4 is a flow chart showing the implementation of one embodiment of the present invention.

A process showing the implementation of one embodiment of the present invention is depicted in FIG. 4. At step 200, the centralized component 39 is monitoring the system clock 43 and the secure clock 41. The idea of monitoring the time difference between an insecure device clock and a secure clock, such as a clock positioned within the network, is discussed in U.S. Pat. Nos. 5,444,780 and 5,500,897, both of which are incorporated herein by reference. At step 210, the centralized component 39 calculates the difference between the time and date of the system clock 43 and the secure clock 41. At step 220, the centralized component 39 modifies the access rights information by the difference that was calculated in step 200. At step 230, the centralized component 39 provides the modified access rights information to the application for which the rights information is needed. The modified access rights information can also be provided to the user at this stop. At step 240, the information is processed by the respective applications. At this point, the date and time information is always relative to a system clock 43 with which the applications and user are already familiar. The date and time information is also according to original access rights given by content providers.

The following is a representation of sample pseudo-computer code for the situation where the access rights information is asked from the centralized component 39 by an application:

```
RightsObject GetROFromServer( )
    T1 = <<the original start time constraint of access rights information
        set by content provider>>
    T2 = <<the original end time constraint of access rights information
        set by content provider>>
    dT := SystemTime( ) – SecureTime( )
    RightsObject.StartTime := T1+dT
    RightsObject.EndTime := T2+dT
    return RightsObject
```

The following is a representation of sample pseudo-computer code for the situation where an application determines whether a user has rights over the content in a start/end constraint case:

```
boolean HasRights( )
    RightsObject := GetROFromServer( )
    T := SystemTime( )
    if ( T >= RightsObject.StartTime AND T <= RightsObject.EndTime )
        return true
    endif
        return false
```

When an application compares the modified access rights to the current system time, which might be off by an arbitrary amount of time, the access rights are still determined according to original permissions given by the content provider and the content provider's own secure clock 41. Whether the content was already expired or was not yet accessible, or if the user had the right to access the content, the comparison of the rights to the system clock 43 at the application level still provides exactly the same information as does comparing the original access rights sent by the content provider to the secure clock 41.

With the present invention, applications deciding whether to grant access to content, or showing the access rights to the user, need only to check the user-friendly system clock 43 and the date and time information of the access rights. The above-described comparison can be performed without needing to worry about whether the system clock 43 shows the accurate time or not, or without even knowing whether there is a secure time source elsewhere. Integration of the secure clock 41 and the support of the secure time source can be freely provided to both various applications and to the user as well.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
monitoring a system clock of an electronic device;
accessing a secure clock, wherein information regarding the secure clock is hidden from an application of the electronic device or a user of the electronic device;
receiving, by the electronic device, a request for access rights information from an application of the electronic device;
calculating, by the electronic device, a difference between a time of the system clock and a time of the secure clock;
modifying, by the electronic device, said access rights information at least in part by the difference between the time of the system clock and the time of the secure clock, wherein said access rights information defines when content can be accessed; and
providing, by the electronic device, the modified access rights information to the application.

2. The method of claim 1, further comprising providing a time to a user based upon the difference between the time of the system clock and the time of the secure clock.

3. The method of claim 1, further comprising providing information to other applications based upon the time of the secure clock.

4. The method of claim 1, wherein the access rights information is a rights object conforming to a digital rights management standard, and modifying said access rights information includes changing permissions of the rights object such that the difference between the system clock and the secure clock is compensated for in the permissions of the rights object.

5. The method of claim 4, further comprising:
receiving, at the electronic device, the rights object from a content provider; and
granting access to content based only on a comparison between the changed permissions of the rights object and the system clock.

6. One or more non-transitory memory units storing computer readable instructions configured to, when executed, cause an apparatus to at least:
monitor a system clock of the apparatus;
access a secure clock, wherein information regarding the secure clock is hidden from an application of the electronic device or a user of the electronic device;
receive a request for access rights information from an application of the apparatus;
calculate a difference between a time of the system clock and a time of the secure clock;
modify said access rights information at least in part by the difference between the time of the system clock and the time of the secure clock, wherein said access rights information defines when content can be accessed; and
provide the modified access rights information to the application.

7. The one or more non-transitory memory units of claim 6, further storing computer readable instructions configured to, when executed, cause the apparatus to provide a time to a user based upon the difference between the time of the system clock and the time of the secure clock.

8. The one or more non-transitory memory units of claim 6, further storing computer readable instructions configured to, when executed, cause the apparatus to provide information to other applications based upon the time of the secure clock.

9. The one or more non-transitory memory units of claim 6, wherein the access rights information is a rights object conforming to a digital rights management standard, and wherein modifying said access rights information includes changing permissions of the rights object such that the difference between the system clock and the secure clock is compensated for in the permissions of the rights object.

10. An apparatus, comprising:
a processor;
one or more memory units storing computer readable instructions configured to, with the processor, cause the apparatus to at least:
monitor a system clock of the apparatus;
access a secure clock, wherein information regarding the secure clock is hidden from an application of the electronic device or a user of the electronic device;
receive a request for access rights information from an application of the apparatus;
calculate a difference between a time of the system clock and a time of the secure clock;
modify said access rights information at least in part by the difference between the time of the system clock and the time of the secure clock, wherein said access rights information defines when content can be accessed; and
provide the modified access rights information to the application.

11. The apparatus of claim 10, wherein the one or more memory units further store computer readable instructions configured to, with the processor, cause the apparatus to provide a time to a user based upon the difference between the time of the system clock and the time of the secure clock.

12. The apparatus of claim 10, wherein the one or more memory units further store computer readable instructions configured to, with the processor, cause the apparatus to provide information to other applications based upon the time of the secure clock.

13. The apparatus of claim 10, wherein the access rights information is a rights object conforming to a digital rights management standard, and wherein modifying the access rights information includes changing permissions of the rights object such that the difference between the system clock and the secure clock is compensated for in the permissions of the rights object.

* * * * *